United States Patent
May et al.

(10) Patent No.: US 12,531,401 B1
(45) Date of Patent: Jan. 20, 2026

(54) DEVICE FOR PROTECTING VERTICALLY INSTALLED ELECTRICAL POWER CABLES

(71) Applicants: Jeremy May, Lindale, TX (US); Sean Landen, Lindale, TX (US)

(72) Inventors: Jeremy May, Lindale, TX (US); Sean Landen, Lindale, TX (US)

( * ) Notice: Subject to any disclaimer, the term of this patent is extended or adjusted under 35 U.S.C. 154(b) by 0 days.

(21) Appl. No.: 18/959,078

(22) Filed: Nov. 25, 2024

Related U.S. Application Data

(60) Provisional application No. 63/691,365, filed on Sep. 6, 2024.

(51) Int. Cl.
*H02G 3/04* (2006.01)

(52) U.S. Cl.
CPC .................. *H02G 3/0406* (2013.01)

(58) Field of Classification Search
CPC ............. G02F 1/133357; G02F 1/1368; G02F 2202/104; G02F 1/136
See application file for complete search history.

(56) References Cited

U.S. PATENT DOCUMENTS

| | | | | |
|---|---|---|---|---|
| 3,958,358 A | * | 5/1976 | Firmin | A01K 85/00 43/42.35 |
| 2010/0065296 A1 | * | 3/2010 | Lalancette | H02G 3/123 174/61 |
| 2010/0314575 A1 | * | 12/2010 | Gao | C09D 5/1681 977/773 |
| 2019/0162331 A1 | * | 5/2019 | Wagner | F16L 3/26 |
| 2021/0330510 A1 | * | 10/2021 | Berry | A61F 13/067 |

OTHER PUBLICATIONS

FR 3004427, Oct. 17, 2014.*

* cited by examiner

*Primary Examiner* — Lawrence D Ferguson
(74) *Attorney, Agent, or Firm* — Plager Schack LLP; Mark H. Plager; Kara K. Verryt

(57) ABSTRACT

A cable protection device for protecting vertically installed cables on a vertical structure, such as electrical cables on a cell phone tower or other tower structure, may include an elongate body and a pair of angled wings extending at an angle outward from opposite edges of a central portion of the elongate body. The device may be made of a rigid, yet pliable material, such as high-density polyethylene with incorporated ultraviolet stabilizers.

8 Claims, 4 Drawing Sheets

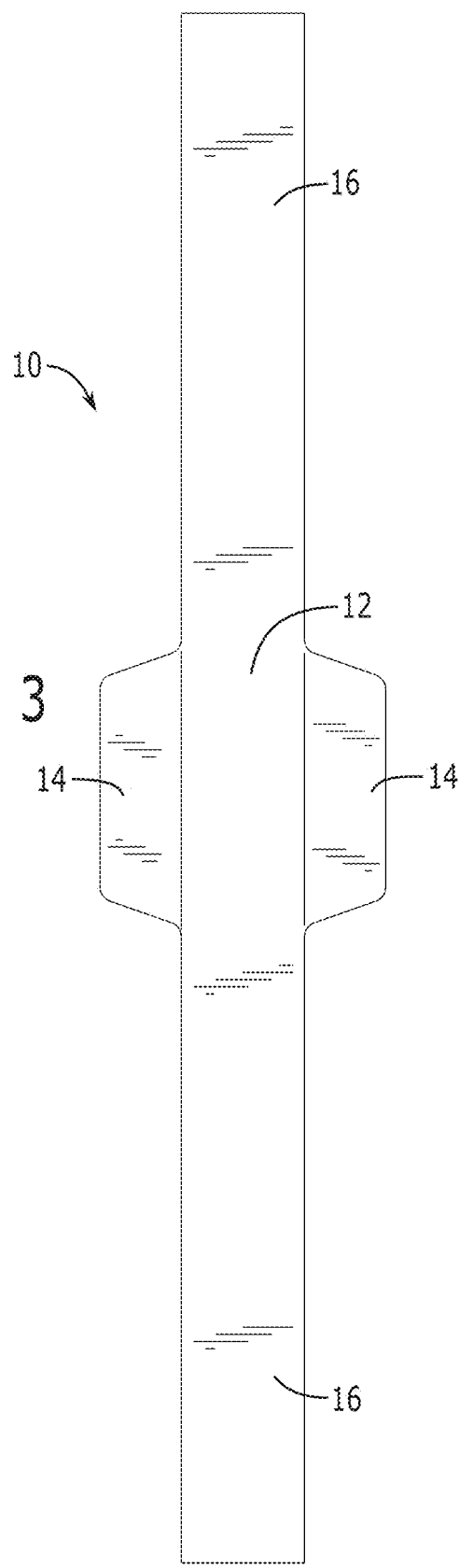
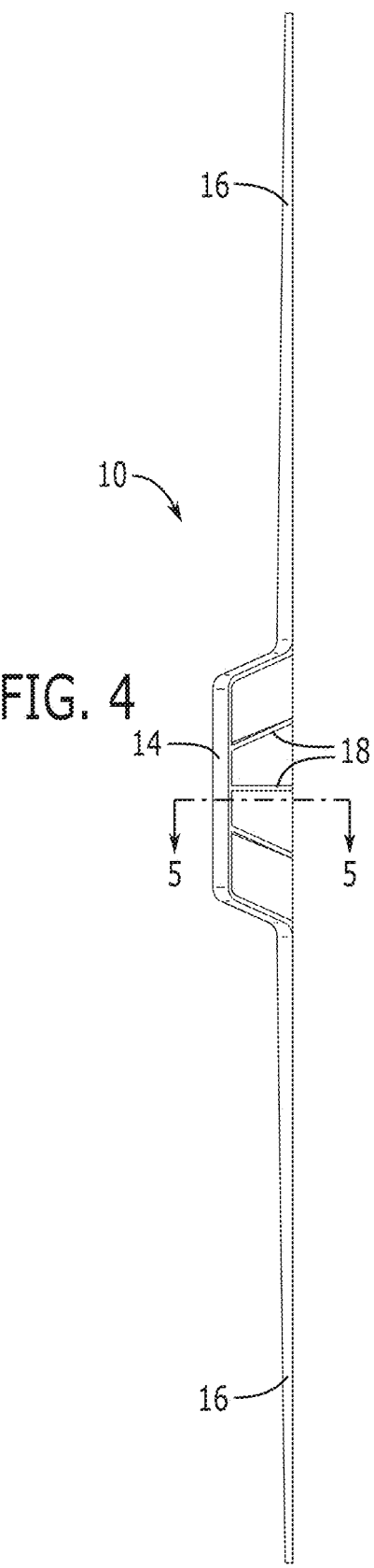

DEVICE FOR PROTECTING VERTICALLY INSTALLED ELECTRICAL POWER CABLES

RELATED APPLICATION

This application claims priority to provisional patent application U.S. Ser. No. 63/691,365 filed on Sep. 6, 2024, the entire contents of which is herein incorporated by reference.

BACKGROUND

The embodiments herein relate generally to tower accessories and, more particularly, to a device for protecting vertically installed electrical power cables on cell phone towers and other tower structures.

The Federal Aviation Administration (FAA) requires towers to be lit when they exceed 200 feet in height or are in certain flight paths. Local jurisdictions may also require tower lighting based on particular criteria. As such, cell phone towers and other tower structures routinely include vertically installed electrical power cables that are susceptible to catch points, abrasion, and stress from the industry standard cable attachment points to the tower during installation and repair of the electrical cables. Typically, installers must lift the cable at these points, increasing weight load by up to 200 pounds, during installation. Conventionally, industry practice is to secure the vertically installed cables by taping them above and below the multiple splice plates on one leg of a cell phone tower, routing the cables vertically on the tower to service the light and equipment that sits atop the tower. However, the conventional installation methods result in cable drop out, where the cable that has been secured above and below obstructions, such as splice plates, slips through the tape and causes it to belly or pull tight onto the splice plates. This creates catch points and abrasion, ultimately leading to cable failure, which in turn leads to lighting failure. There is no current solution on the market for this issue.

Therefore, what is needed is an easily installed cable protection device for protecting vertically installed cables on a tower from abrasion and damage caused at conventional obstruction points along the height of the tower.

SUMMARY

Some embodiments of the present disclosure include a cable protection device for protecting vertically installed cables on a vertical structure, such as electrical cables on a cell phone tower or other tower structure. The device may include an elongate body and a pair of angled wings extending at an angle outward from opposite edges of a central portion of the elongate body. The device may be made of a rigid, yet pliable material, such as high-density polyethylene with incorporated ultraviolet stabilizers.

BRIEF DESCRIPTION OF THE FIGURES

The detailed description of some embodiments of the invention is made below with reference to the accompanying figures, wherein like numerals represent corresponding parts of the figures.

FIG. 3 is a front elevation view of one embodiment of the present disclosure.

FIG. 4 is a side elevation view of one embodiment of the present disclosure.

DETAILED DESCRIPTION

Figure 1:
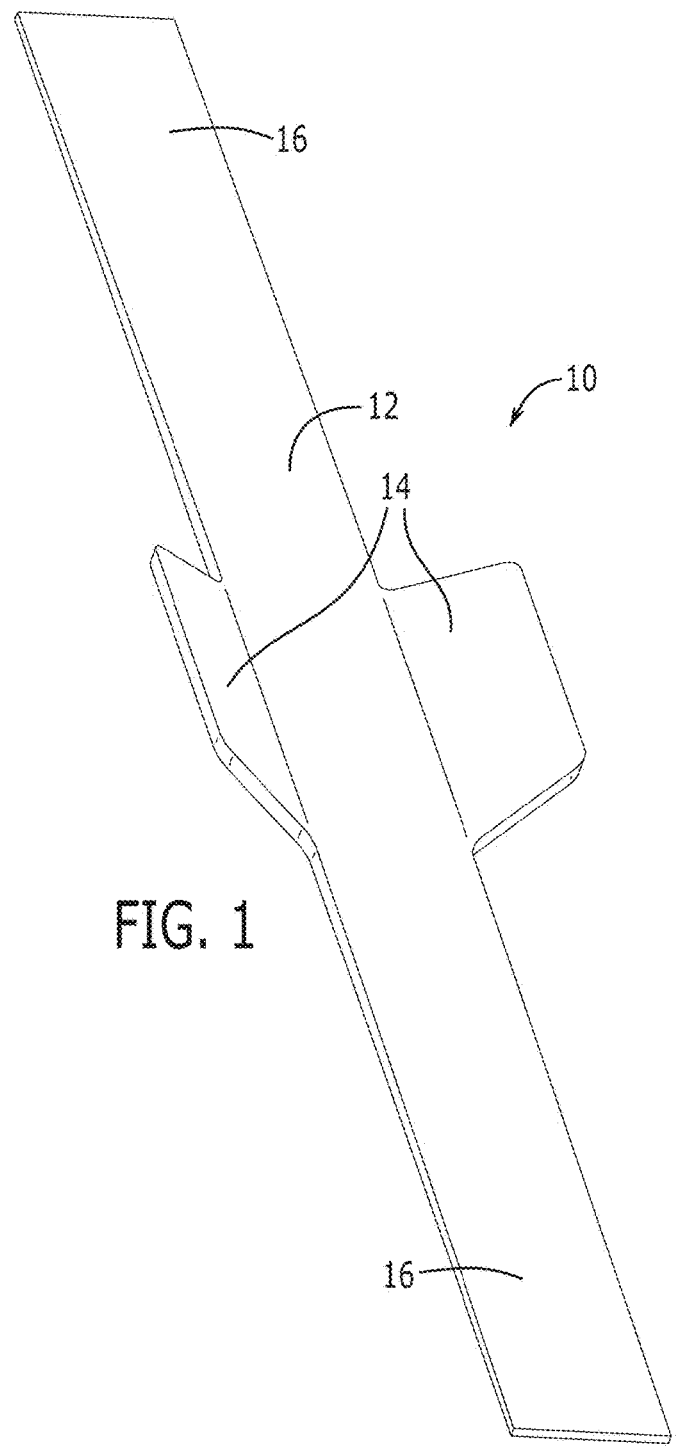
FIG. 1 is a front perspective view of one embodiment of the present disclosure.
Figure 2:
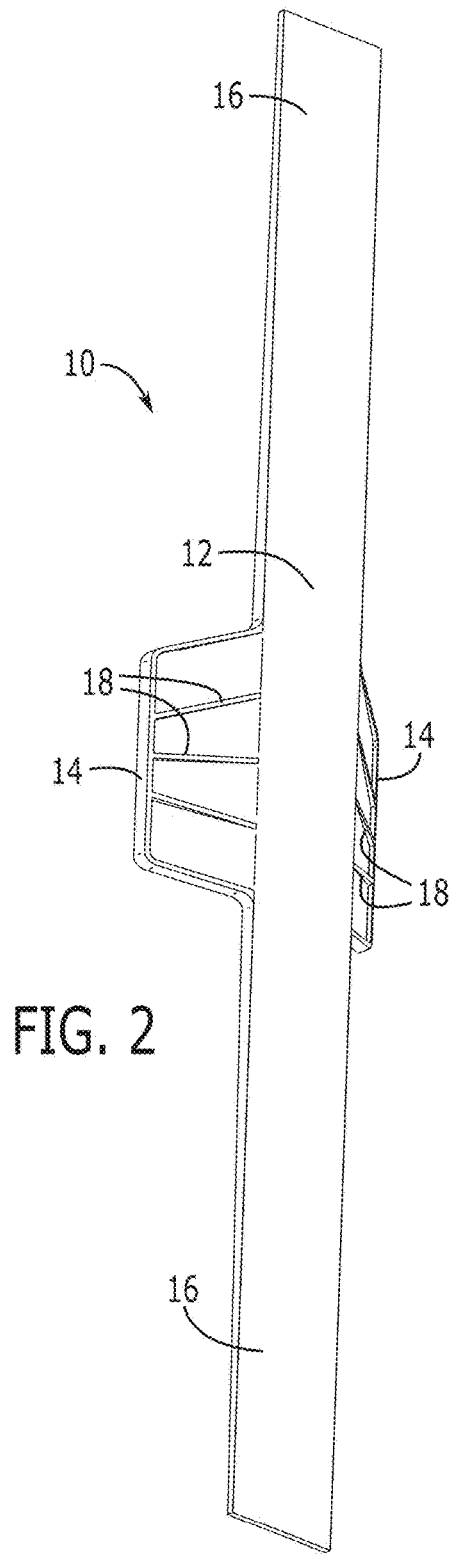
FIG. 2 is a rear perspective view of one embodiment of the present disclosure.
Figure 5:
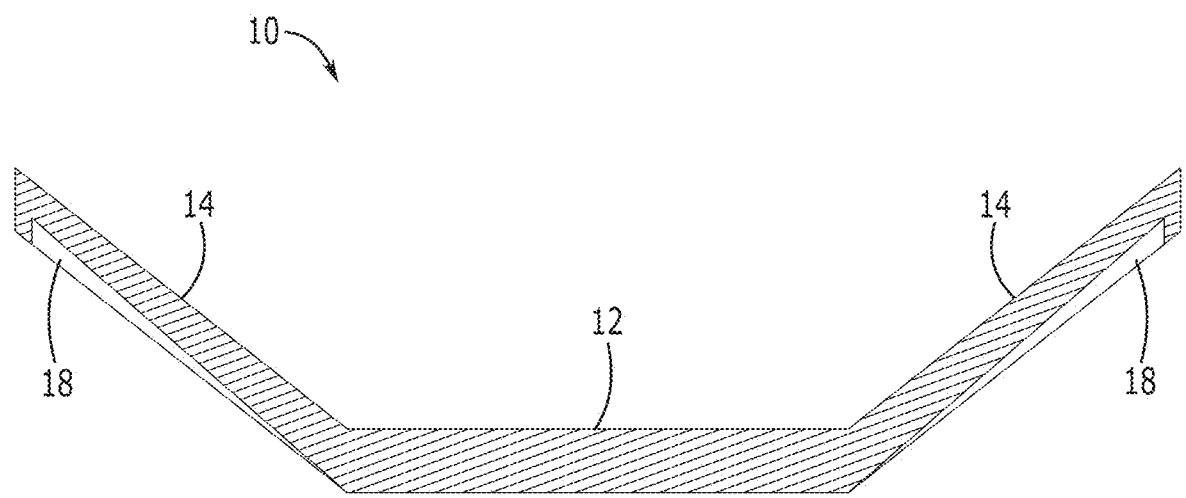
FIG. 5 is a cross-sectional view of one embodiment of the present disclosure, taken along line 5-5 in FIG. 4.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as to protect vertically installed electrical cables on call phone towers and other like structures and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-6, some embodiments of the present disclosure include a cable protection device 10 for protecting vertically installed cables on a vertical support, such as electrical cables 24 installed on a cell phone tower 11 or other tower structure, wherein the cable protection device 10 comprises an elongate body 12 having a first end 16, a second end 16, and a central portion; and a pair of angled wings 14 extending at an angle outward from opposite edges of the central portion of the elongate body 12, wherein the cable protection device 10 is configured to prevent catch points and abrasion and to relieve stress from attachment points, while simultaneously alleviating the need for a worker to lift the cables at such points. Use of the device 10 is simple and creates uniformity in the install, which is easily seen on a visual inspection. Use of the device 10 may also prevent drop out over time from weather and installer issues.

Figure 6:
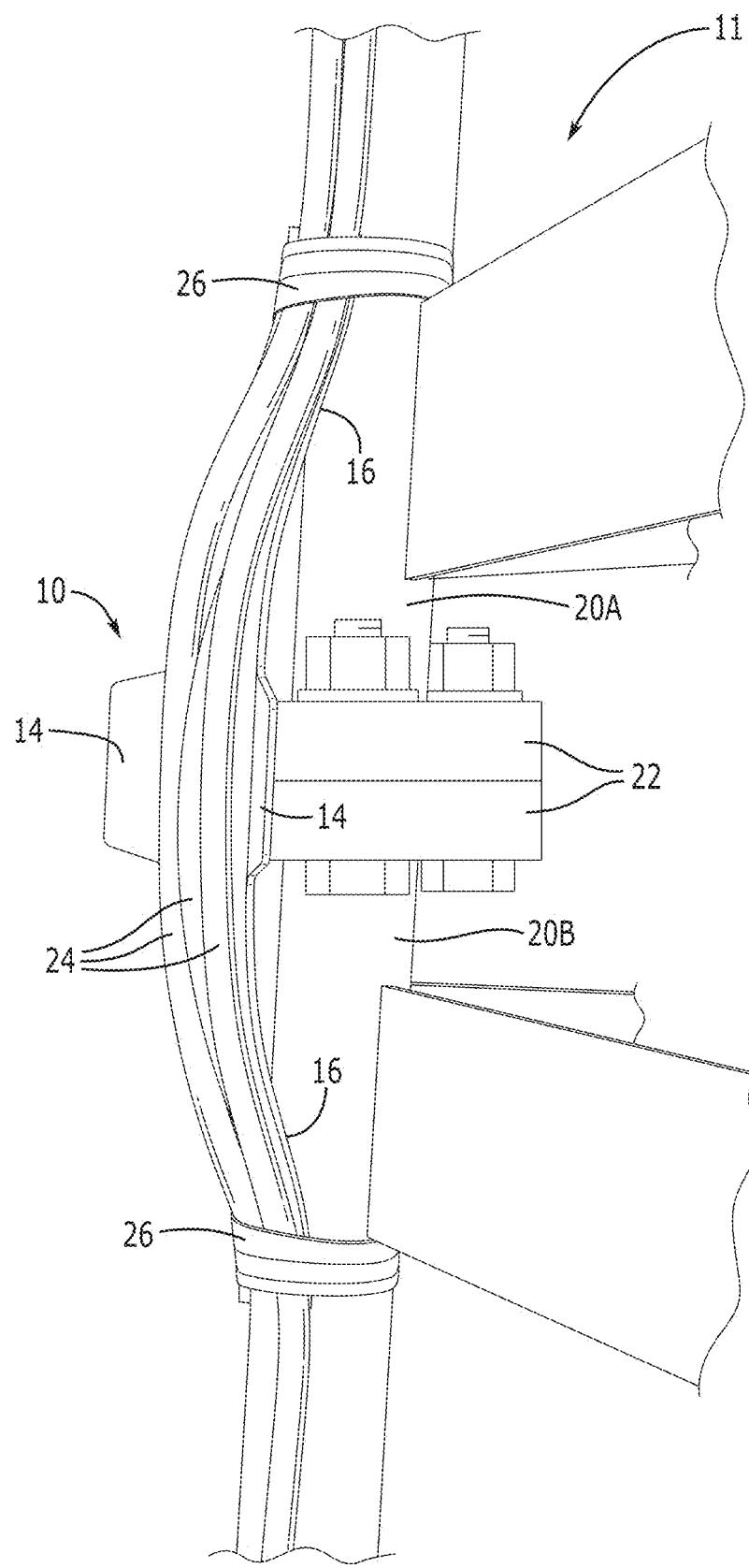
FIG. 6 is a detailed perspective view of one embodiment of the present disclosure, shown in use.

More specifically, and as shown in the Figures, the elongate body 12 may comprise a substantially rectangular strip with the first end 16, the second end 16, and the central portion, wherein the elongate body 12 has a top surface and a bottom surface. As shown in FIG. 4, a thickness of the elongate body 12 may taper from a largest thickness proximate to the central portion to a smallest thickness at both the first end 16 and the second end 16. As mentioned above, the pair of wings 14 may extend outward in opposite directions from opposite edges of the central portion of the elongate body 12. For example, each of the wings 14 may extend upward from the top surface of the outer edge of the elongate body at an angle of, for example, about 30 to about 60°, such as about 45°. As shown in the Figures, the wings 14 may each have a substantially trapezoidal shape with tapered first and second edges. A distance between the wings 14 may be larger than a width of the cables 24 to be supported on the device 10. In some embodiments, a bottom surface of the wings 14 may comprise a plurality of support ribs 18 extending outward therefrom, wherein, the support ribs 18 may increase rigidity and strength of the wings 14. The wings 14, together with the central portion of the elongate body 12, may form a cradle-like structure for supporting cables 24, as shown in FIG. 6. As shown in the Figures, the elongate body 12 and the wings 14 may be a single unit.

The cable protection device 10 of the present disclosure may be made of any suitable materials. Suitable materials may be those that are rigid, yet pliable while also being resistant to weather and other external elements. For example, the device 10 may be injected molded from plastic. More specifically, the device 10 may comprise a high-density polyethylene and ultraviolet (UV) stabilizers injection molded into the described and shown shape.

While dimensions of the device 10 may vary depending on intended use, when used for vertically installed cables 24 on a cell phone tower or other tower structure, the device 10 may have the following suitable exemplary dimensions. The central portion of the elongate body 12 may have a thickness of about 6.35 mm. Each wing 14 may have a thickness of about 3.15 mm, a height of about 35 mm, a shorter length of about 100 mm, and a longer length of about 126 mm, wherein the shorter length is the length of the wing 14 along an edge distal from the elongate body 12, and the longer length is the length of the wing 14 at the junction of the wing 15 and the elongate body 12.

To use the device 10 of the present disclosure, a user may slide the cable protection device 10 under the vertically installed cables 24, center lined in the obstruction, such as a splice plate 22 at a junction of an upper tower leg 20A and a lower tower leg 20B, as shown in FIG. 6. Because of the material used to create the device 10, the device 10 may form a curved ramp or bridge for supporting the cables 24 over the obstruction. The device 10 may be secured to the cables and tower using a known method, such as by using the industry standard 2-3-4 taping method with securing tape 26, at both the first end 16 and the second end 16 of the device 10. An additional cable protection device 10 may be used at each splice plate junction or other obstruction.

While the device 10 of the present disclosure is described above as being used for vertically installed cables 24 on cell phone towers 11 or other tower structures, it is envisioned that the device 10, particularly with varying dimensions, may be used in other applications where a cable, rope, or other elongate item is secured or runs along a support with obstructions.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A cable protection device for protecting vertically installed cables on a vertical structure, the cable protection device comprising:
an elongate body; and
a pair of angled wings extending at an angle outward from opposite edges of a central portion of the elongate body, wherein:
each wing of the pair of angled wings is rigid, flat, and maintains a consistent angle with respect to the elongate body, thus resulting in the cable protection device having an open-faced profile, such that a cable placed on the cable protection device is supported but not entirely encircled by the cable protection device; and
the elongate body is flexible.

2. The cable protection device of claim 1, wherein:
the elongate body comprises a rectangular strip with a first end, a second end, and the central portion positioned between the first end and the second end;
a thickness of the elongate body tapers from a largest thickness proximate to the central portion to a smallest thickness at both the first end and the second end.

3. The cable protection device of claim 1, wherein each wing of the pair of angled wings extends outward and upward from the respective edge of the elongate body at an angle of from about 30 to about 60°.

4. The cable protection device of claim 3, wherein each wing of the pair of angled wings extends outward and upward from the elongate body at the same angle.

5. The cable protection device of claim 1, wherein a bottom surface of each wing of the pair of angled wings comprises a plurality of support ribs extending outward therefrom.

6. The cable protection device of claim 1, wherein each wing of the pair of angled wings has a trapezoidal shape with tapered first and second edges.

7. The cable protection device of claim 1, wherein the device comprises a high-density polyethylene material.

8. The cable protection device of claim 1, wherein a distance between the pair of angled wings is greater than a width of the cables to be supported.

* * * * *